(12) United States Patent
Schoebrechts et al.

(10) Patent No.: US 11,652,363 B2
(45) Date of Patent: May 16, 2023

(54) UNINTERRUPTIBLE-POWER-SUPPLY MACHINE

(71) Applicant: KS Research Société Anonyme, Battice (BE)

(72) Inventors: Jacques Schoebrechts, Battice (BE); Joseph Frippiat, Battice (BE)

(73) Assignee: KS Research Société Anonyme, Battice (BE)

( * ) Notice: Subject to any disclaimer, the term of this patent is extended or adjusted under 35 U.S.C. 154(b) by 194 days.

(21) Appl. No.: 17/292,354

(22) PCT Filed: Oct. 29, 2019

(86) PCT No.: PCT/IB2019/059252
§ 371 (c)(1),
(2) Date: May 7, 2021

(87) PCT Pub. No.: WO2020/095149
PCT Pub. Date: May 14, 2020

(65) Prior Publication Data
US 2022/0085647 A1     Mar. 17, 2022

(30) Foreign Application Priority Data

Nov. 8, 2018 (BE) .................................. 2018/5785
Aug. 30, 2019 (BE) .................................. 2019/5571

(51) Int. Cl.
*H02J 9/08*     (2006.01)
*H02J 3/30*     (2006.01)
*H02K 1/24*     (2006.01)

(52) U.S. Cl.
CPC ...... *H02J 9/08* (2013.01); *H02J 3/30* (2013.01); *H02K 1/24* (2013.01); *H02K 2213/03* (2013.01)

(58) Field of Classification Search
CPC .... H02J 3/30; H02J 9/066; H02J 9/08; H02K 1/24; H02K 2213/03; H02K 49/043; H02K 7/025; H02K 7/11; Y02E 60/16
See application file for complete search history.

(56) References Cited

U.S. PATENT DOCUMENTS 4,982,129 A * 1/1991 Eggert .................... H02K 3/28
310/216.106
2010/0231181 A1 9/2010 Ming et al.
(Continued)

FOREIGN PATENT DOCUMENTS

EP    1533884 A1 *   5/2005  ............ H02K 17/16
EP    1533884 A1     5/2005
(Continued)

OTHER PUBLICATIONS

English Translation of the International Search Report dated Nov. 29, 2019, which pertains to PCT/IB2019/059252, filed Oct. 29, 2019, 2 pages.

*Primary Examiner* — Naishadh N Desai
(74) *Attorney, Agent, or Firm* — Dinsmore & Shohl LLP (57) ABSTRACT

UPS machine comprising a synchronous machine (9) coupled to an accumulator (10) of kinetic energy, which accumulator essentially comprises: a body (12) with a main shaft; a hollow drum (18) able to rotate about the axle; a pony motor, for starting the drum (18); a rotor (20) fastened to the main shaft coaxially with the drum (18), which is equipped with coils (24) in order to electromagnetically couple the drum (18) and the rotor (20); characterised in that: the rotor (22) comprises a core (21) made of iron with a certain number of poles (22) that are delineated by notches (23) parallel to the main shaft (11) and that are distributed around the circumference of the core (21) which, for each poll (22), is provided with a winding (24) wound in the notches (23) around the pole (22) in question; the cumula- (Continued)

tive width of all of the poles (22) in the narrowest portion thereof is at least equal to the cumulative width.

20 Claims, 5 Drawing Sheets

(56) References Cited

U.S. PATENT DOCUMENTS

| | | | |
|---|---|---|---|
| 2010/0253172 A1* | 10/2010 | Kupisiewicz | H02K 3/16 |
| | | | 318/807 |
| 2016/0020675 A1 | 1/2016 | DeBabrata et al. | |
| 2016/0072358 A1 | 3/2016 | Roland et al. | |

FOREIGN PATENT DOCUMENTS

| | | |
|---|---|---|
| EP | 2945263 A2 | 11/2015 |
| EP | 2989713 A2 | 3/2016 |
| FR | 1364072 A | 6/1964 |
| JP | H05115169 A | 5/1993 |

\* cited by examiner

UNINTERRUPTIBLE-POWER-SUPPLY MACHINE

CROSS-REFERENCE TO RELATED APPLICATIONS

The present application is the National Phase entry of International Patent Application No. PCT/IB2019/059252 filed Oct. 29, 2019, the entire contents of which is hereby incorporated by reference into this application.

BACKGROUND

Technical Field

The present disclosure relates to a rotor for uninterruptible-power supply (UPS) machine and a UPS machine provided with such a rotor.

UPS machines are primarily intended to safeguard users sensitive to disturbances in an electrical network, i.e., loads at user level, such as, for example, hospital intensive care units or digital data storage companies and highly computerized services, for which an interruption of the electrical network for a few milliseconds endangers human lives or causes significant financial costs.

It is known to use a UPS machine comprising a synchronous machine with low internal impedance which can operate as a motor or as an alternator, this synchronous machine being coupled to an accumulator with a large reserve of kinetic energy which is stored in a rotating metal mass.

Description of the Related Art

Such a machine is known from European patent EP 1,533,884 from the same applicant, which discloses a UPS machine comprising a synchronous machine coupled to a kinetic energy accumulator which comprises:
  a frame;
  a main shaft rotatably mounted in the frame and coupled to the synchronous machine;
  a coaxial hollow drum that can rotate freely around the main shaft and is independent thereof;
  a motor, called a Pony motor, for launching the drum up to a certain speed at the UPS start-up, in order to accumulate kinetic energy in the drum;
  a rotor fixed onto the main shaft in the form of a claw rotor which is provided with coils being connected to an exciter in order to achieve an electromagnetic coupling between the drum and the rotor in the event of network failure so as to recover the kinetic energy stored in the drum in order to drive the synchronous machine when a DC electric current is sent to the rotor coils through the exciter.

This machine is connected between the network and the user loads by a choke.

During the uninterrupted operation of the network, the drum is launched at a certain speed, such as 3000 rpm, while the speed of the main shaft with the claw rotor and the synchronous machine rotor is kept at a lower speed, such as 1500 rpm. The speed difference constitutes the kinetic energy available to drive the synchronous machine as an alternator in the event of network failure.

One such machine is known from EP 1,533,884. This machine has many advantages over other known UPS machines, such as:
  its reduced size;
  the fact that the machine, by virtue of its combination with the choke and the low impedance of the synchronous machine, also plays the role of network conditioner and constitutes a filter with respect to all short-term disturbances that may occur on the network and a filter with respect to the harmonics which may be present on the voltage supplied to the users and/or on the network voltage upstream of the UPS;
  the service life of the bearings which support the main shaft in the frame and the drum on the shaft, is linked to the relative speed of these bearings which do not exceed 1500 rpm in the example given above;
  the fact that it may be connected to any generator set without a mechanical coupling that intervenes when the network is down for more than 10 seconds, for example;
  not needing an additional external motor to start the UPS system.

The UPS machine of EP 1,533,884 is dimensioned in such a way that when a power failure occurs, the machine has sufficient kinetic energy to ensure a minimum autonomy of about 12 seconds with sufficient output power to supply the users devices.

On the other hand, the field of use of such a machine is limited as to its autonomy and as to the power to be supplied to the users and as to the recovery time after a network failure so that the machine is quickly ready to intervene following another network failure.

SUMMARY

The object of the present disclosure is to improve the performance of the UPS machine as disclosed in EP 1,533,884 and to considerably increase the electrical power that the kinetic energy accumulator can provide beyond the maximum power that can be supplied by the accumulator of the UPS machine of EP 1,533,884 in order to be able to guarantee a broader power range and greater flexibility of use with a higher output power combined with a reduced autonomy, this autonomy being sufficient for certain applications such as digital data storage centers or various processes that can stop a few seconds without prejudice to their users.

This objective is considered without intending to affect the advantages of the machine of EP 1,533,884, therefore respecting the small footprint of the kinetic energy accumulator of this UPS machine.

This objective is achieved by replacing the claw rotor of the UPS machine of EP 1,533,884 with a rotor of the same size and a more classic architecture than that of an alternator rotor, that is to say, equipped with an iron core having a number of poles defined by longitudinal notches distributed around the circumference of the core which, for each pole, is provided with a coil wound in the notches around the pole concerned, but dimensioned in such a way that the cumulative width of all of the poles at their narrowest point is at least equal to the cumulative width of all of the notches at their widest point, in a such a way that the minimum cumulative width of all of the poles is at least twice the maximum cumulative width of all the notches, the width of the poles and the notches being measured in a section perpendicular to the axis of the machine and, therefore, to the axis of the rotor.

Other electrical machines are known from patent documents JPH05115169, US2010/231181 and US2016/020675, these machines being provided with such a rotor.

This atypical rotor architecture increases the active area of the poles while reducing the area of the notches in which the active copper conductors are housed. The section of the polar cores is thus increased with respect to the section of the notches which contain the copper, the section of the poles being the active surface which intervenes for the electromagnetic coupling between the drum and the accumulator rotor in order to maintain sufficient torque over a longer period of time so as to drive the synchronous machine in its alternator function, even for powers substantially greater than those obtained from the claw rotor.

The rotor is specially designed to create important electromagnetic losses in the drum in order to create a greater torque between the drum and the rotor, without having to achieve a good sinusoidal distribution of the induction in the air gap and, therefore, to achieve a high-power kinetic energy accumulator that can drive a higher power alternator, even if it means reducing the autonomy of the machine below 12 seconds for very high load powers in the event of a network failure, which is quite acceptable for certain applications where the autonomy can be reduced in favor of a greater power.

Indeed, because the surface of the notches was reduced in favor of the active section of the poles, it will be necessary to cause a very strong current to flow in the rotor coil conductors so that a large magnetic flux can pass through the poles for the very high powers without risking destroying the coils by rapid heating of the latter, which can limit the time during which these high powers can be maintained.

Due to the stronger coupling between the drum and the rotor thanks to the increased active section of the poles, the coupling will be maintained longer for powers comparable to those obtained with an energy accumulator equipped with a claw rotor.

In the case of the claw rotor, the coupling will be lost, for example, as soon as the speed of the drum drops below 1700 rpm for a rotor speed of 1500 rpm. Therefore, there remains a kinetic energy corresponding to a speed difference of 200 rpm which is unused.

On the other hand, in the case of the present disclosure, the coupling will remain active longer and up to 1500 rpm, which gives better use of the kinetic energy stored in the drum below 1700 rpm and therefore a longer autonomy.

Thus, it is possible to manufacture a UPS machine which is characterized by a greater autonomy compared to the machine known from EP 1,533,884, but which also makes it possible to couple the new energy accumulator with a synchronous machine of higher power, such as of twice the power, in order to protect users, even if it means reducing the autonomy during which this double power can be protected.

An experimental UPS machine according to the present disclosure was produced showing surprisingly improved performance compared to the UPS machine of EP 1,533,884 with a claw rotor of the same size:
  a remarkable increase in torque and accumulated energy thanks to the new rotor model;
  a much shorter response time to reach a given power;
  a significantly higher power obtained for the new rotor after a given time;
  an autonomy increased by 5 to 20% at all powers and full powers two to three times greater;
  a larger field of use in terms of powers at the output of the machine;
  an almost constant level of available energy for the entire range of powers in the field of use.
In addition,
  the manufacture of the new rotor is more conventional and is, therefore, less expensive than the manufacture of the claw rotor;
  the new rotor reduces the risks of remanent magnetization of the machine shaft and, therefore, its harmful effects on the service life of the bearings (no axial coil).

The stator of the Pony motor may be built as a Gramme ring with a toroidal coil which takes up less space and makes it possible to produce a kinetic energy accumulator with a relatively small footprint.

The present disclosure also relates to a rotor for an energy accumulator of a UPS machine and to an accumulator equipped with such a rotor, which comprises an iron core with a number of poles defined by longitudinal notches distributed around the core circumference which, for each pole, is provided with a coil wound in the notches around the pole concerned, the narrowest point of the cumulative width of all the poles of such coil being at least equal to the cumulative width of the totality of the notches at their widest point, the cumulative width of all the poles at their narrowest point being at least twice the width of all of the notches at their widest point; the rotor being characterized in that it comprises wide poles and narrow poles, with a different width depending on their angular position, which are arranged as follows:
  the poles must be alternately N & S at the periphery of the rotor;
  the wide poles must be in multiples of two and alternately N & S at the periphery of the rotor;
  the narrow poles must be in multiples of two and alternately N & S or S & N at the periphery of the rotor.

Such an arrangement of the poles may be considered in order to modify the torque characteristic based on the relative speed between the rotor and the drum.

The present disclosure also relates to the use of such a rotor in a kinetic energy accumulator of a UPS machine, the energy accumulator being initially intended to operate with a claw rotor, the accumulator comprising:
  a frame;
  a main shaft rotatably mounted in the frame and being coupled to the synchronous machine;
  a coaxial hollow drum that can rotate freely around the main shaft and is independent thereof;
  a motor, called a Pony motor, for launching the drum up to a certain speed at the UPS start-up, in order to accumulate kinetic energy in the drum;
  the rotor being installed in place of the claw rotor on the main shaft, coaxially with the drum, and having the same size, the rotor coils being connected to an exciter for achieving an electromagnetic coupling between the drum and the rotor in the event of a network failure in order to recover the kinetic energy stored in the drum, so as to drive the synchronous machine when a DC electric current is sent to the rotor coils through the exciter.

BRIEF DESCRIPTION OF THE DRAWINGS

In order to better understand the object of the present disclosure, a practical configuration of a kinetic energy accumulator is disclosed below on the basis of the appended figures. These figures illustrate the following elements.

DETAILED DESCRIPTION

Figure 1:
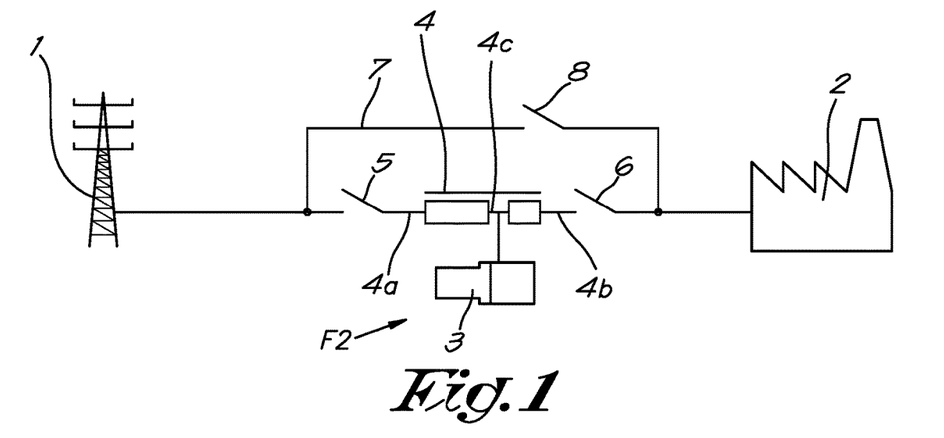
FIG. 1 shows a schematic view of an electrical network provided with a UPS machine having a kinetic energy accumulator according to the present disclosure.

FIG. 1 is a schematic view of an urban or industrial electrical network 1, supplying electrical energy to a sensitive load 2 of a site, the load 2 being constituted by all the users in a factory or in a data center and requiring to be protected by an uninterruptible power supply machine, called the UPS machine 3, which must intervene to supply load 2 in the event of a failure of network 1.

In the example of FIG. 1, the load 2 is connected to network 1 through a three-terminal choke 4, that is to say, to an input terminal 4a connected to network 1 through an input circuit breaker 5, an output terminal 4b connected to the load 2 by an output circuit breaker 6 and an intermediate terminal 4c to which the UPS machine 3 is connected.

The choke 4 limits the current supplied by the UPS machine 3 to the network 1 in the event of the network 1 failure in order to protect the load 2 from an excessive voltage drop and from a high power demand in the first moments after the network 1 failure and before opening the circuit breaker 5.

In order to allow maintenance work on the UPS machine 3, a bypass connection 7 with a bypass circuit breaker 8 enables the UPS machine 3 to be isolated in combination with the opening of circuit breakers 5 and 6.

Figure 2:
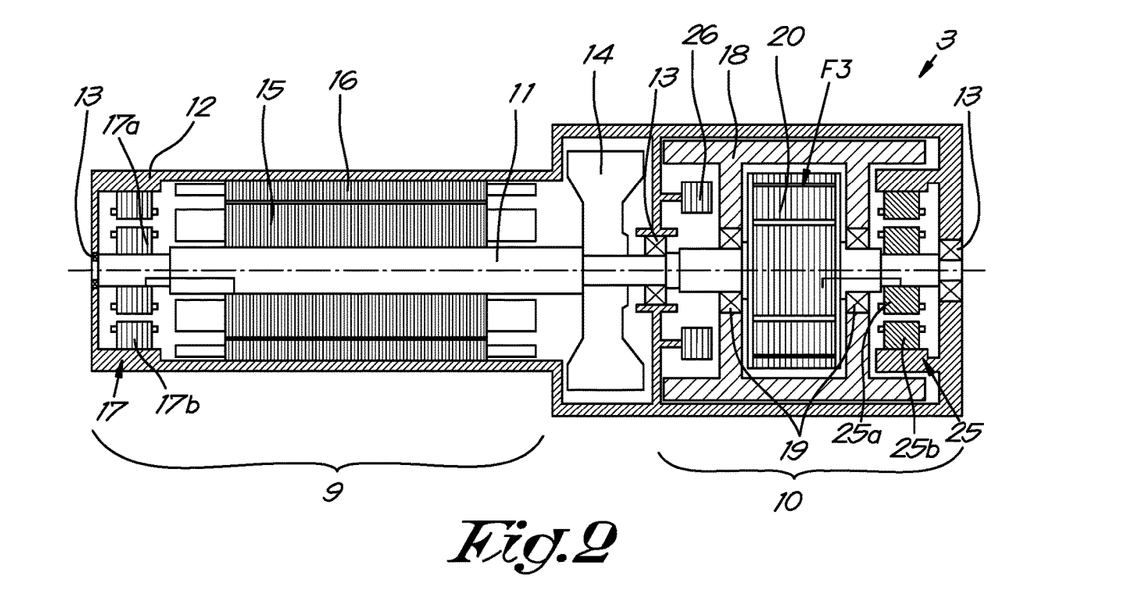
FIG. 2 shows a scale greater than a cross section of the UPS machine indicated by arrow F2 in FIG. 1.
Figure 3:
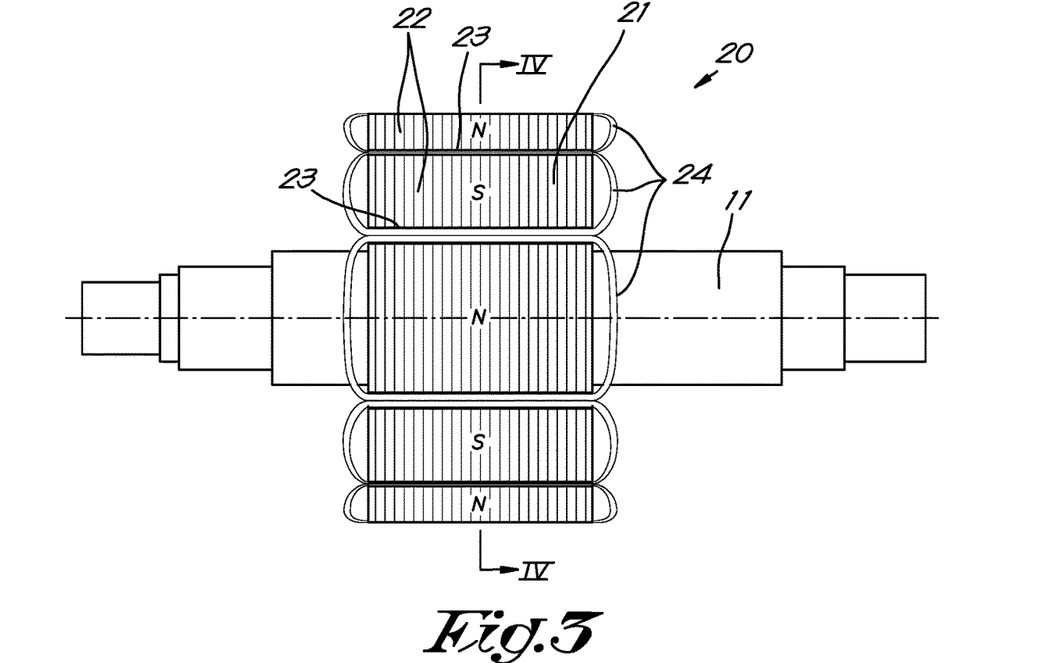
FIG. 3 shows a side view of the rotor indicated by arrow F3 in FIG. 2.

As illustrated in FIG. 2, the UPS machine 3 includes a synchronous machine 9 with low internal impedance and a kinetic energy accumulator 10 according to the present disclosure, which are mounted on a rotating main shaft 11; the latter being mounted in a frame 12 using bearings 13.

The main shaft 11 also comprises a flywheel 14.

The synchronous machine 9 may operate as a motor or as an alternator and includes a rotor 15 mounted on the main shaft 11 surrounded by a stator 16 and an exciter 17 with a rotor 17a connected to the rotor 15 and a stator 17b which can be connected to an external electrical source in order to control the operation of the synchronous machine 9.

The accumulator 10 comprises a hollow accumulator steel drum 18 which can rotate freely around the main shaft 11 and is independent thereof by bearings 19 mounted on the main shaft 11.

A coaxial rotor 20 is fixed to the main shaft 11 inside the drum 18.

Figure 4:
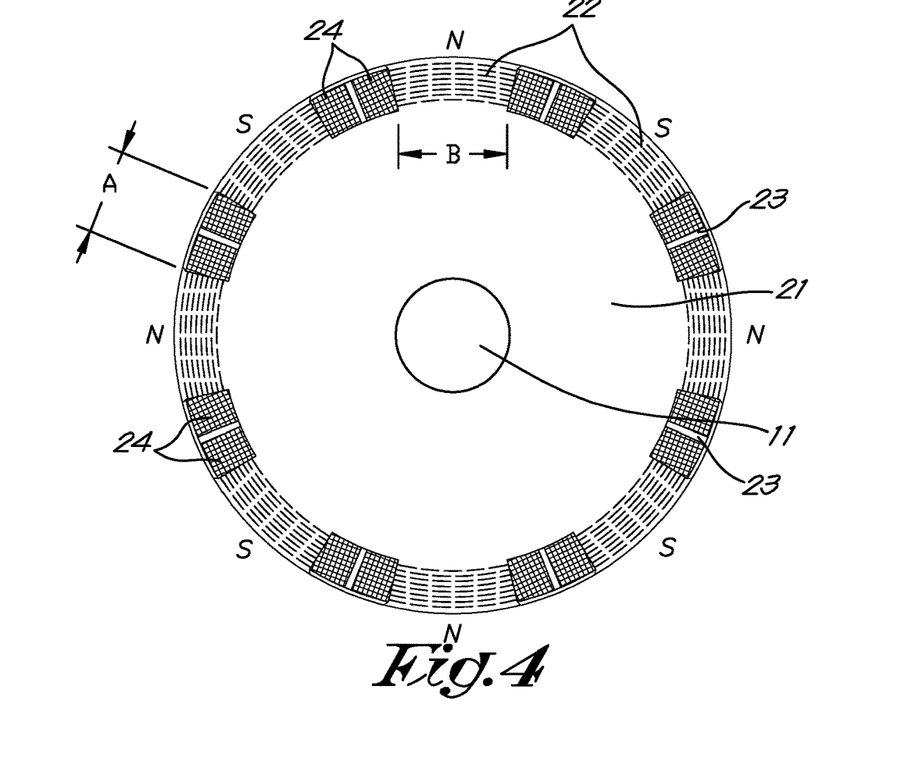
FIG. 4 shows a cross-section indicated by the line IV-IV in FIG. 3.

The rotor 20 includes a mainly cylindrical steel core 21 with a number of poles 22 defined by radial notches 23 parallel to the main shaft 11. The notches 23 have a maximum width A, as shown in FIG. 4, the notches 23 being distributed uniformly around the circumference of the core 21. The poles 22 have a minimum width B, as shown in FIG. 4, which represents the active width of these poles.

Each pole 22 is provided with a coil 24 in the form of an electrical copper conductor which is coiled in the notches 23 around the pole 22 concerned.

When a current is sent through the coils 24, the poles become magnetic poles 22 North (N) and South (S) to form an electromagnetic coupling between the rotor 20 and the drum 18.

In the case of FIG. 4, rotor 20 is an eight-pole rotor, although the number of poles 22 may be different.

The accumulator 10 is provided with an exciter 25 having a rotor 25a which is fixed onto the main shaft 11 and which is electrically connected to the coils 24 of the rotor 20 of the accumulator 10 and with a stator 25b which can be powered by an external electric source to control the behavior of the accumulator 10.

The accumulator 10 also includes an electric motor 26, called a Pony motor, designed to drive the drum 18 up to a certain speed when starting the UPS machine 3, and to accumulate kinetic energy in drum 18.

The Pony motor 26 may be a known Gramme ring, as disclosed in EP 1,533,884, with a toroidal coil connected to an external frequency converter (not shown).

The present disclosure is characterized by the distribution between the width A and the width B, or between the maximum width of the notches 23 and the active width of the poles 22, the totality of the minimum widths of all the poles 22 being at least equal to the totality of the maximum widths of the notches 23 in the case of the present disclosure illustrated in FIG. 4.

Figure 5:
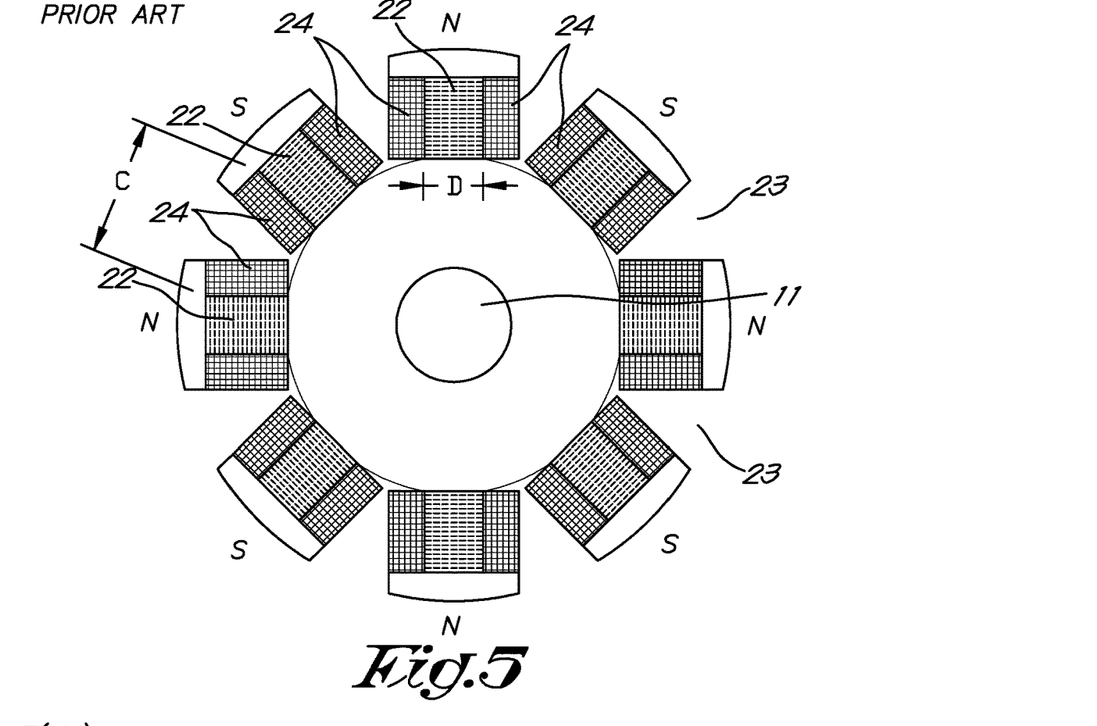
FIG. 5 shows, in comparison with FIG. 4, a conventional rotor of an alternator with the same number of poles.

Such an architecture is atypical if compared to the architecture of a conventional alternator rotor with the same span and the same number of poles, as shown in FIG. 5. Such a conventional rotor is, for example, known from the application of patent EP 2,989,713, although for a machine with a completely different configuration than that of the present disclosure.

This conventional rotor of FIG. 5 is dimensioned with a completely different ratio between the width C of the notches and the active width D of the poles, in order to be able to operate continuously.

When comparing FIGS. 4 and 5, the flow passage surface in zone B is much larger in the case of the rotor 20 according to the present disclosure of FIG. 4 than in zone D of the conventional rotor of FIG. 5. Now, the power that can be obtained in an energy accumulator is, all other things being equal, directly proportional to that surface.

On the other hand, the space (section) available in the notches 23 for the coils 24 is approximately 2 to 3 times smaller than that according to the present disclosure in comparison with the conventional rotor.

Taking into account the reduction in the section of the notches 23 in the two aforementioned cases, it will be necessary to use a current two to three times higher in the excitation rotor 20 of FIG. 4 in order to obtain the same number of ampere-turns in the coils 24, and, therefore, the same induction in the poles 22, and, therefore, according to the $RI^2$ law, an excitation power of 4 to 9 times greater dissipated in a coil 24 of reduced volume.

A similar comparison of the flow passage surfaces may be made between the rotor 20 according to the present disclosure and the claw rotor which is the object of patent EP 1,533,884 and which has the same breadth. In the case of the claw rotor, the flow passage surface is of the order of 3 to 4 times smaller than the corresponding surface of the rotor 20 according to the present disclosure and the ampere-turns per coil barely 10 to 20% higher than those of the rotor 20 of the present disclosure, under the same current density conditions. Taking also into account the partially homopolar nature of the claw rotor generating a flux variation in the air gap of the order of 30 to 40% lower with respect to the rotor 20 according to the present disclosure, it follows that the torque and, therefore, the power obtained are ultimately of the order of 3 to 4 times greater in the case of the present disclosure.

The use of the UPS machine 3 is explained below.

In normal operation, that is to say, without failure of the network 1, the circuit breakers 5 and 6 are closed and the circuit breaker 8 is open.

The synchronous machine 9 is supplied by the network 1 and operates as a motor to drive the main shaft 11 at a given speed of 1500 rpm, for example, corresponding to the frequency of the network 1. Therefore, the rotor 20 of the accumulator 10 and the rotors 17*a* and 25*a* of exciters 17 and 25 rotate at that same speed.

The drum 18 is maintained at a speed greater than the speed of the main shaft 11, typically between 1900 and 3000 rpm, in order to accumulate sufficient kinetic energy to support the load 2 in the event of a failure of the network 1 with a desired autonomy, such as 12 seconds.

The speed of the drum 18 is adjusted according to the load 2 through the Pony motor 26 and its frequency converter. If the load 2 increases, the speed of the drum 18 is immediately increased in order to be able to supply enough energy to cope with a failure of the network 1.

The UPS machine 3 also plays the role of a network conditioner by its combination with the choke 4, the low impedance of the synchronous machine 9 and the inertia of the flywheel 14.

It constitutes a filter with respect to all short-term disturbances which do not exceed 60 to 80 ms which may occur on the network 1, as well as a filter with respect to the harmonics which may be present on the voltage of load 2 or the network 1 voltage.

When a more serious failure of the network 1 is detected, for example, when the network 1 disappears altogether or if there is an excessive voltage drop, the control system of the UPS machine 3 opens the input circuit breaker 5 immediately to avoid the synchronous machine 9 having to supply the network 1 in addition to the load 2. Indeed, in the event of a failure (generally far from the inlet of the UPS machine 3), the network 1 presents a considerable load for the UPS machine 3, a load that the latter would not be able to maintain very long on the network 1.

The object of the choke 4 is to limit the amount of current that can be returned to the network 1 and reduce the level of harmonics coming from the network 1 to the load 2 and vice versa.

As soon as the network 1 failure is detected and the input circuit breaker 5 is opened, the energy transfer from the drum 18 is initiated and a DC current is simultaneously introduced into the exciter 25, which will produce an AC voltage transformed into a DC current by a rectifier (not shown in the figures).

This establishes an electromagnetic coupling between the drum 18 and the main shaft 11, which will maintain the speed of the synchronous machine 9 around 50 Hz and will allow the users to be supplied without disturbance.

The current that is sent to the exciter 25 acts as an important lever, since, with a few amps, a considerable power can be controlled through a small exciter 25.

The kinetic energy stored in the drum 18, for example with a speed of 1500 rpm at full power relative to the main shaft, is used to drive the synchronous machine 9 in its function of alternator to supply the load 2. As the kinetic energy decreases in the absence of the network 1, the speed of the drum 18 decreases and gets closer and closer to the speed of the main shaft 11 until the moment when the electromagnetic coupling between the drum 18 and the rotor 20 of accumulator 10 becomes insufficient to continue to drive synchronous machine 9.

Figure 6:
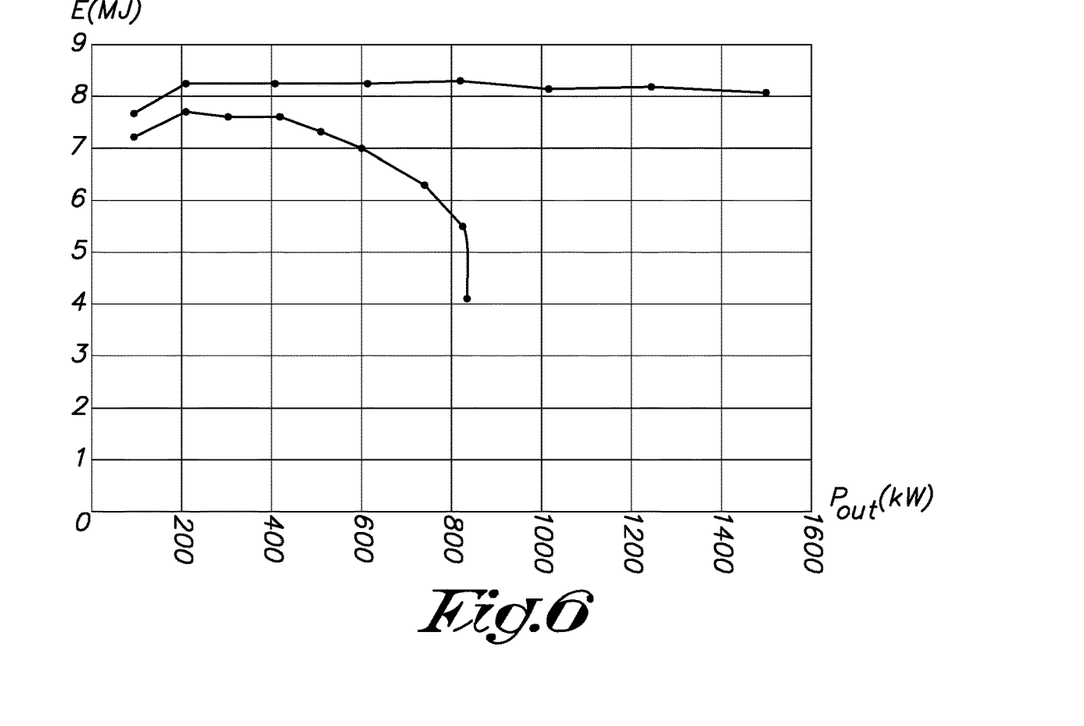
FIG. 6 shows a comparison between the graph of the energy available as a function of the output power for a UPS machine according to the present disclosure and for a UPS machine according to EP 1,533,884 of the same size and in which the claw rotor was replaced with a rotor according to the present disclosure.
Figure 7:
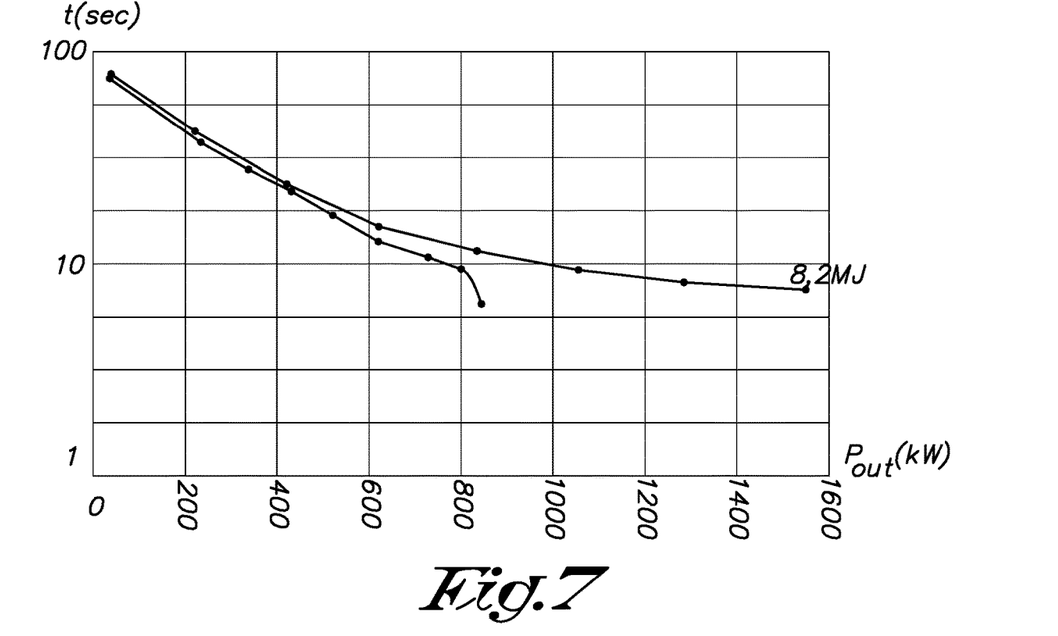
FIG. 7 shows the same comparison of FIG. 6 but for the autonomy curves based on the power for the two machines, respectively for the output power based on the differential speed between the drum and the main shaft 50 msec after excitement.
Figure 8:
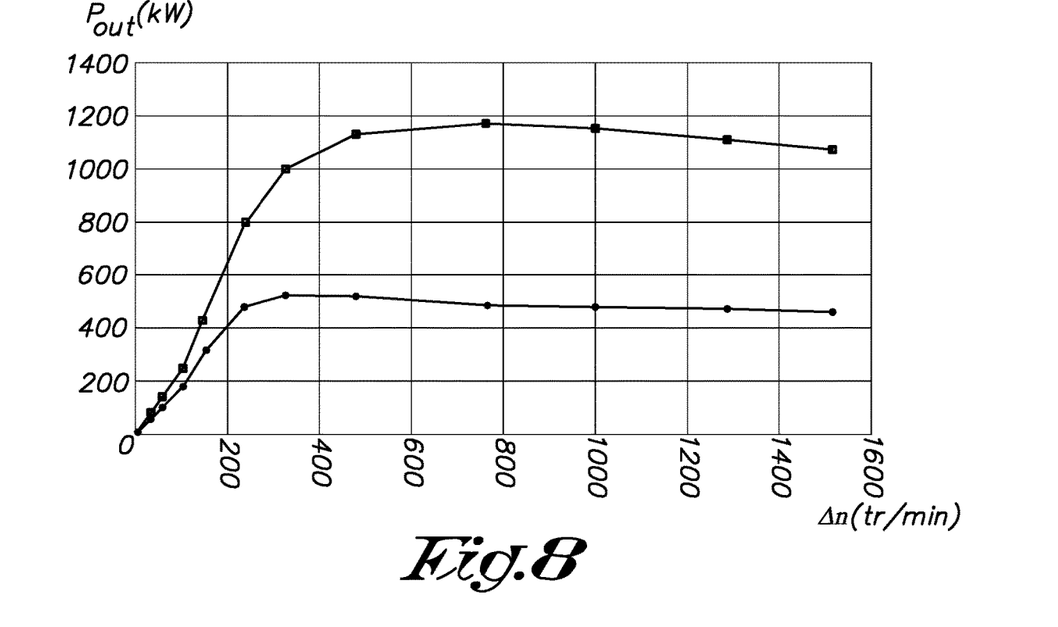
FIG. 8 shows the same comparison of FIG. 6 but for the autonomy curves based on the power for the two machines, respectively for the output power based on the differential speed between the drum and the main shaft 50 msec after excitement.

The performance of the UPS machine 3 according to the present disclosure is clearly better than in the UPS with a claw rotor according to EP 1,533,884 of the same size, as can be seen from the diagrams of the experimental performance of FIGS. 6 to 8.

FIG. 6 represents the energy storage capacity of the UPS machine 3 expressed in MJ based on the output power of the UPS machine 3 to be delivered to the load 2.

The accumulated energy expresses the product of the autonomy and the power of the UPS-type machine 3.

It can be seen on the diagram of FIG. 6 that, for a machine with a nominal power of 800 kW produced according to patent EP 1,533,884, the available energy capacity of this machine is increased from 6 to 8 MJ by the simple and only replacement of the claw rotor by the rotor according to the present disclosure, all other elements being the same otherwise.

This means that, in the first case, the accumulated energy of 6 MJ allows an autonomy of 7.5 seconds and, in the case of the present disclosure, an autonomy of more than 10 sec.

With the former claw rotor, it is observed that, as the output power increases beyond 400 kW, the available energy decreases and it is practically impossible to provide more than 800 kW.

With the new rotor 20, it is possible to achieve powers beyond the maximum power of the claw rotor, and even more than double that power in the case of FIG. 6.

Therefore, a synchronous machine 9 of suitable power will be needed.

In addition, the accumulated energy is practically constant over the entire output power range, which is more practical for characterizing the UPS machine 3 with a single parameter such as an 8.2 MJ machine, allowing to easily deduce its autonomy based on the power of load 2 to be protected, giving eventually an autonomy of 16.4 seconds for a load of 500 kW, an autonomy of 8.2 seconds for a load 2 of 1000 kW and 5.5 seconds for 1500 kW.

Although it is not possible to achieve a 12-second autonomy for some applications at full power, a shorter autonomy is sufficient.

A larger field of use is thus obtained with UPS machines of high power but low autonomy. This means that, for the same price as that of a machine of medium power and long autonomy, it is possible to have a machine of double or even triple power, and of shorter autonomy, which was not possible until now.

The difference between the curves in FIG. 6 can be explained by the fact that, with the former rotor, the electromechanical coupling between the drum 18 and the claw rotor is lost when the drum 18 speed decreases below 1700 rpm with a speed of 1500 rpm for the rotor, in comparison with the atypical rotor 20 according to the present disclosure with which the coupling is maintained up to a drum speed of almost 1500 rpm.

FIG. 7 shows the diagram of the autonomy of the UPS machine in both cases.

It can be seen that the UPS machine 3 according to the present disclosure has better autonomy than the former machine over the entire power range thereof and still retains an acceptable autonomy for certain applications for higher powers.

FIG. 8 shows the output power of the UPS machine 3 based on the relative speed between the drum 18 and the rotor on the main shaft 11, 50 msec after the application of an intermediate voltage of 300 VDC on the exciter 25.

If a voltage of 300 VDC is applied when the drum 18 turns 1000 rpm faster than the main shaft 11, it is observed that, after 50 msec, the torque obtained with the claw rotor gives a power of approximately 500 KW, while with the new rotor a power of 1150 kW is already obtained.

For a relative speed at full power of 1500 rpm, the available power goes from 460 kW to 1120 kW. This means that, after 50 ms, a power, which will prevent an excessively rapid drop in speed and an exit from the frequency tolerance (generally −1 Hz), will be obtained.

Figure 9:
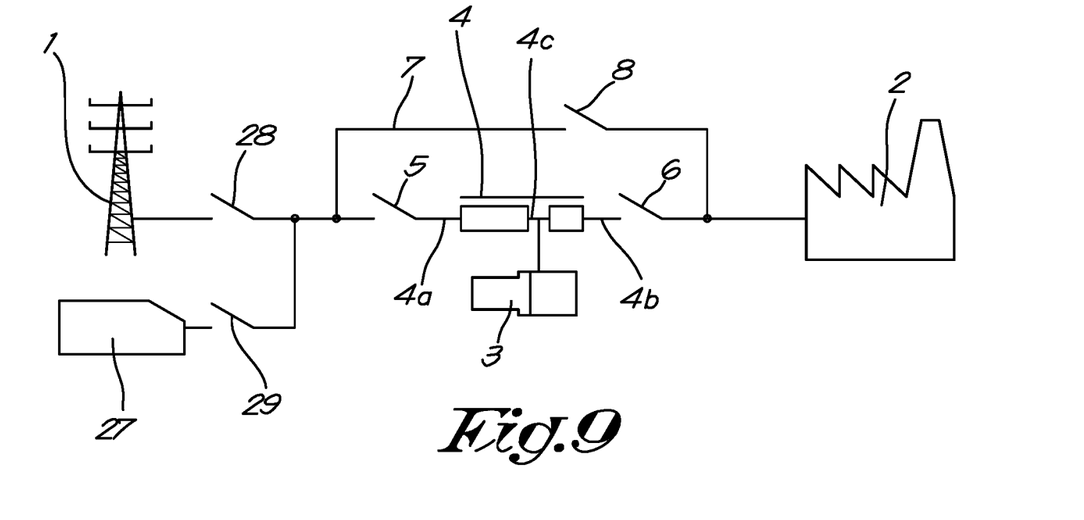
FIG. 9 shows another electrical network according to the present disclosure.

If the autonomy of the UPS machine 3 is not sufficient to cover the duration of the network 1 failure, it is possible to add a generator set 27, as shown in FIG. 9, by a source inverter consisting of two circuit breakers 28 and 29.

Figure 10:
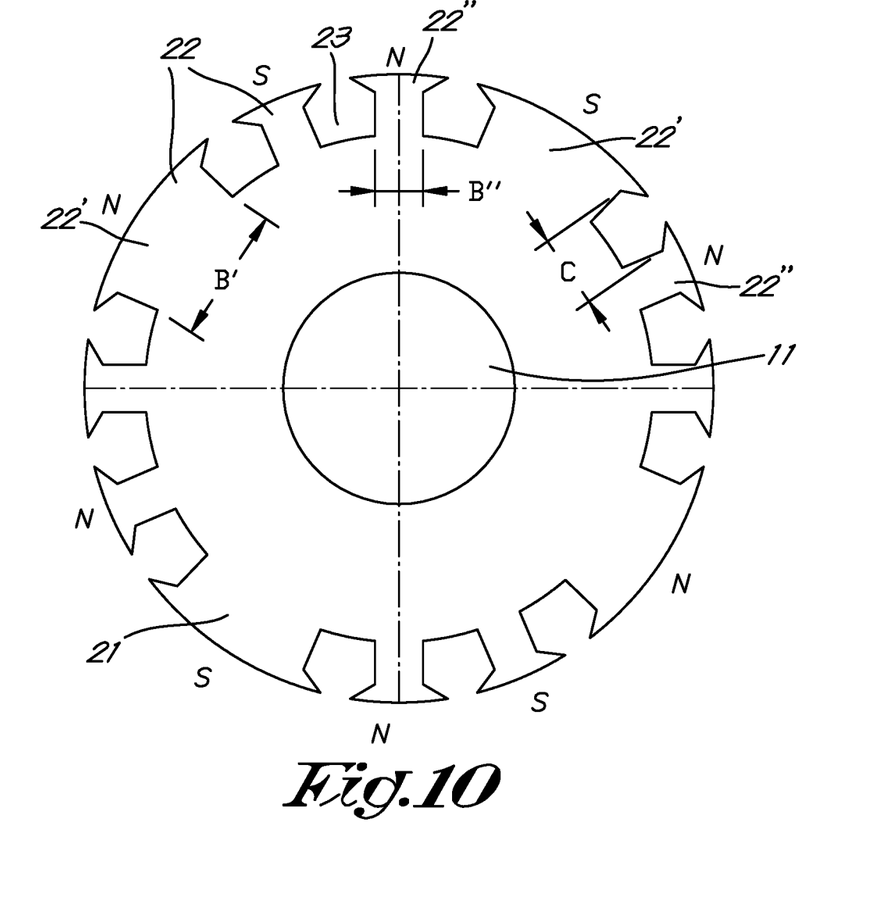
FIG. 10 shows a section like that of FIG. 4 for another embodiment of the core of a kinetic energy accumulator rotor according to the present disclosure.

The core 21, shown in FIG. 10, is a core 21 of a reciprocating rotor 20 according to the present disclosure which differs from the core of the rotor 20 of FIG. 4 in that the notches 23 are not distributed uniformly around the core 21 and that, therefore, the width B of the poles 22 is different depending on their angular position, with a configuration integrating wide poles 22□, having a minimum width B□, and narrow poles 22□, having a minimum width B□.

In FIG. 10, the poles 22 are arranged as follows:
the poles 22 must be alternately N & S at the periphery of the rotor 20;
the wide poles 22□ must be in multiples of two and alternately N & S at the periphery of the rotor 20;
the narrow poles 22□ must be in multiples of two and alternately N & S or S & N at the periphery of the rotor 20;
the sum of the widths B□ and B□ of all of the poles 22□ and 22□ at their narrowest point must be at least equal to or substantially greater than the sum of the widths C of all of the notches 23 at their widest point, which, in the case of FIG. 10, is located on another diameter.

Such an arrangement of the poles may be considered in order to modify the torque characteristic based on the relative speed between the rotor 20 and the drum 18.

It is appreciated that the present disclosure is in no way limited to the embodiments disclosed above, but that numerous modifications may be made to the kinetic energy accumulator disclosed above without departing from the scope of the present disclosure as defined in the following claims.

The invention claimed is:

1. A rotor for an energy accumulator of an uninterruptible power supply machine, the rotor comprising:
an iron core with a certain number of poles, defined by notches parallel to an axis of the rotor, distributed around a circumference of the core which, for each pole, is provided with a coil wound in the notches around the pole concerned,
wherein a cumulative width of all the poles at their narrowest point is at least equal to a cumulative width of all the notches at their widest point, the width being measured in a section perpendicular to the axis of the rotor,
wherein the poles have a different width depending on their angular position and comprise wide poles and narrow poles which are arranged as follows:
the poles must be alternately N & S at a periphery of the rotor;
the wide poles must be in multiples of two and alternately N & S at the periphery of the rotor;
the narrow poles must be in multiples of two and alternately N & S or S & N at the periphery of the rotor.

2. The rotor according to claim 1, wherein the cumulative width of all the poles at their narrowest point is at least twice the cumulative width of all the notches at their widest point.

3. An uninterruptible power supply machine comprising a synchronous machine coupled to a kinetic energy accumulator, the kinetic energy accumulator comprising:
a frame;
a main shaft rotatably mounted in the frame and being coupled to the synchronous machine;
a coaxial hollow drum capable of rotating freely around the main shaft and independent thereof;
an electric motor for launching the drum up to a certain speed at the uninterruptible power supply start-up, in order to accumulate kinetic energy in the drum;
a rotor fixed on the main shaft coaxially with the drum and provided with coils connected to an exciter in order to achieve an electromagnetic coupling between the drum and the rotor in an event of a failure of a network in order to recover the kinetic energy stored in the drum so as to drive the synchronous machine when an electric current is sent to the coils of the rotor through the exciter;
wherein the rotor is the rotor according to claim 1.

4. The uninterruptible power supply machine according to claim 3, wherein the cumulative width of all of the poles at their narrowest point is at least twice the cumulative width of all of the notches at their widest point.

5. The uninterruptible power supply machine according to claim 3, wherein the rotor of the kinetic energy accumulator is such that it allows an instantaneous current density at the coils which is greater than 8 Amp/mm$^2$.

6. The uninterruptible power supply machine according to claim 5, wherein the rotor of the kinetic energy accumulator is such that it can support without failing an instantaneous current density at the coils which is greater than 8 Amp/mm$^2$ for a period of at least twelve seconds.

7. The uninterruptible power supply machine according to claim 3, wherein the exciter comprises a stator having coils and a rotor which is fixed on the main shaft, the coils of the stator being connected to a source of at least one of alternating AC electric current and direct DC current.

8. The uninterruptible power supply machine according to claim 3, wherein the stator of the electric motor is produced in the form of a Gramme ring.

9. The uninterruptible power supply machine according to claim 8, wherein the Gramme ring is connected to a variable frequency power supply.

10. The uninterruptible power supply machine according to claim 3, wherein the drum is made of steel.

11. The uninterruptible power supply machine according claim 3, wherein the uninterruptible power supply machine has an energy capacity of at least 8 MJ in an output power range between 200 kW and 1400 kW.

12. The uninterruptible power supply machine according to claim 11, wherein the uninterruptible power supply machine has an energy capacity of at least 8 MJ which remains mainly constant in a range of output powers between 200 kW and 1400 kW.

13. The uninterruptible power supply machine according to claim 3, wherein the uninterruptible power supply machine is connected to an intermediate terminal of a choke with three terminals which connect a load to the network.

14. The uninterruptible power supply machine according to claim 13, wherein the network is connected to an input terminal of the choke with three terminals in parallel to a generator set which is turned on when the network is down for a determined period.

15. Use of a rotor according to claim 1, in a kinetic energy accumulator of an uninterruptible power supply machine, the kinetic energy accumulator being intended to operate with a claw rotor, the accumulator comprising:
   a frame;
   a main shaft rotatably mounted in the frame and coupled to a synchronous machine;
   a coaxial hollow drum capable of rotating freely around the main shaft axis and independent thereof;
   a motor for launching the drum up to a certain speed at the uninterruptible power supply start-up, in order to accumulate kinetic energy in the drum;
   the rotor being fixed in place of a claw rotor on the main shaft, coaxially with the drum, and having a same size, the coils of the rotor being connected to an exciter in order to achieve an electromagnetic coupling between the drum and the rotor in an event of a failure of a network in order to recover the kinetic energy stored in the drum so as to drive the synchronous machine when an electric current is sent to the coils of the rotor through the exciter.

16. The uninterruptible power supply machine according to claim 3, wherein the electric motor is a Pony motor.

17. The uninterruptible power supply machine according to claim 5, wherein the instantaneous current density at the coils is greater than 10 Amp/mm$^2$.

18. The uninterruptible power supply machine according to claim 6, wherein the instantaneous current density at the coils is greater than 10 Amp/mm$^2$.

19. The uninterruptible power supply machine according to claim 6, wherein the period is at least 16 seconds.

20. The uninterruptible power supply machine according to claim 6, wherein the period is at least 24 seconds.

* * * * *